(12) United States Patent
Nakashima et al.

(10) Patent No.: US 7,122,278 B1
(45) Date of Patent: Oct. 17, 2006

(54) NON-AQUEOUS ELECTROLYTE SECONDARY BATTERY

(75) Inventors: Takuya Nakashima, Osaka (JP); Shinji Arimoto, Osaka (JP); Masatoshi Nagayama, Katano (JP); Yoshiaki Nitta, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 347 days.

(21) Appl. No.: 09/936,611

(22) PCT Filed: Jun. 21, 2000

(86) PCT No.: PCT/JP00/04040

§ 371 (c)(1),
(2), (4) Date: Sep. 14, 2001

(87) PCT Pub. No.: WO00/79620

PCT Pub. Date: Dec. 28, 2000

(30) Foreign Application Priority Data

Jun. 23, 1999 (JP) .................. 11/176447

(51) Int. Cl.
*H01M 4/50* (2006.01)
*H01M 4/58* (2006.01)
*H01M 4/62* (2006.01)
*H01M 4/36* (2006.01)

(52) U.S. Cl. .......... 429/224; 429/218.1; 429/231.8

(58) Field of Classification Search .......... 429/224, 429/231.1, 231.4, 231.6, 231.9; 29/623.1, 29/623.5

See application file for complete search history.

(56) References Cited

U.S. PATENT DOCUMENTS

| | | | | |
|---|---|---|---|---|
| 5,532,084 A | * | 7/1996 | Wang et al. | 429/224 |
| 5,972,536 A | * | 10/1999 | Yamada et al. | 429/231.4 |
| 6,124,057 A | * | 9/2000 | Ito et al. | 429/213 |
| 6,132,903 A | * | 10/2000 | Fujimoto et al. | 429/231.95 |
| 6,168,888 B1 | * | 1/2001 | Iwata et al. | 429/231.95 |
| 6,372,386 B1 | * | 4/2002 | Cho et al. | 429/231.95 |

FOREIGN PATENT DOCUMENTS

| | | | |
|---|---|---|---|
| EP | 853347 A1 | * | 7/1998 |
| EP | 880187 A2 | * | 11/1998 |
| JP | 04-132174 | * | 5/1992 |
| JP | 9-180758 | * | 7/1997 |
| JP | 09-283180 | * | 10/1997 |
| JP | 9283180 | | 10/1997 |
| JP | 11-111342 | * | 4/1999 |
| JP | 11111342 | | 4/1999 |
| JP | 11-343109 | * | 12/1999 |

(Continued)

OTHER PUBLICATIONS

International Search Report dated Sep. 12, 2000, published with WO 00/79620, Dec. 28, 2000.

(Continued)

*Primary Examiner*—Jonathan Crepeau
(74) *Attorney, Agent, or Firm*—Stevens, Davis, Miller & Mosher, LLP

(57) ABSTRACT

A non-aqueous electrolyte secondary battery provided with a positive electrode having a lithium-manganese composite oxide as a positive electrode material, a negative electrode comprising a material capable of absorbing and releasing lithium and a non-aqueous electrolyte can be inhibited from deterioration of the negative electrode and can maintain excellent battery performances even after stored in a high-temperature environment or subjected to charging and discharging cycles at high temperatures by containing at least one of sodium (Na), potassium (K), calcium (Ca) and strontium (Sr).

5 Claims, 1 Drawing Sheet

FOREIGN PATENT DOCUMENTS

| | | | |
|---|---|---|---|
| JP | 11343109 | | 12/1999 |
| JP | 2000-012014 | * | 1/2000 |
| JP | 2000-012015 | * | 1/2000 |
| JP | 200012014 | | 1/2000 |
| JP | 200012015 | | 1/2000 |
| JP | 2000-113877 | * | 4/2000 |
| JP | 2000113877 | | 4/2000 |
| KR | 1998078121 | | 11/1998 |

OTHER PUBLICATIONS

English translation of Korean Office Action dated May 25, 2006.

* cited by examiner

NON-AQUEOUS ELECTROLYTE SECONDARY BATTERY

TECHNICAL FIELD

The present invention relates to a non-aqueous electrolyte secondary battery using a lithium manganese composite oxide as a positive electrode material, and particularly to an improvement of negative electrode of the battery.

BACKGROUND ART

Non-aqueous electrolyte batteries which have recently been utilized as main electric sources of mobile communications equipment and portable electronic equipment have the features of high electromotive force and high energy density. As positive electrode materials used in these non-aqueous electrolyte batteries, there are known composite oxides of lithium and transition metals having electrons in the 3 d orbit, such as lithium cobaltate ($LiCoO_2$), lithium nickelate ($LiNiO_2$), lithium manganate ($LiMn_2O_4$), and the like. Especially, lithium manganese composite oxides have the advantages that they are less in environmental pollution and cheaper than other oxides, and, from this viewpoint, research and development of the lithium manganese composite oxides are now being conducted intensively.

According to the research and development, in addition to the improvement of battery capacity and safety, the following problems are investigated.

Since there is a great need for non-aqueous electrolyte batteries as electric sources, particularly, of portable mobile terminals, various environments of use are supposed. Therefore, environmental tests are indispensable in development of batteries. For example, such tests are necessary which are conducted on the supposition that they are used in an atmosphere of high temperature and high humidity, in an environment of low temperature, and the like.

Especially, when non-aqueous electrolyte batteries are used or stored in an environment of high temperatures such as the inside of cars in summer, battery performances such as battery capacity and cycle characteristics are sometimes damaged.

Furthermore, the deterioration of battery performances of non-aqueous electrolyte batteries stored in an environment of high temperatures causes further serious problems in non-aqueous electrolyte batteries which use lithium manganese composite oxides as positive electrode materials.

The direct cause for the above problems is that the manganese ion dissolves out of the lithium manganese composite oxide which is an active material of positive electrode. From this viewpoint, investigation has been made on materials which inhibit the dissolution of the manganese ion from the active material of positive electrode. For example, JP-A-9-73902 discloses a technique of controlling the amount of sodium contained in lithium manganese composite oxide of the positive electrode to 0.1–0.8% by weight to remove impurities contained in the material, thereby inhibiting dissolution of manganese ion. Moreover, JP-A-9-82360 discloses a technique of inhibiting dissolution of manganese ion by covering the surface of lithium manganese composite oxide which is a positive electrode material with a lithium ion conductive solid electrolyte.

These techniques are based on the standpoint of reducing the reactivity of the electrolyte with the active material of positive electrode and are effective for inhibiting deterioration of battery characteristics in the case of using or storing the batteries in an environment of high temperatures.

DISCLOSURE OF INVENTION

However, the above conventional techniques require additional steps of washing and re-heating treatments in the process of preparation of materials for positive electrode materials and in the process of synthesis of lithium manganese composite oxides. Therefore, the above techniques have the problems of requiring synthesis time and cost for preparation of the starting materials and the active materials of positive electrode. The techniques suffer from the further problem that the deterioration of battery characteristics in the case of storing the batteries in an environment of high temperatures can be inhibited, but dissolution of manganese ion cannot be completely prevented.

The present invention solves these conventional problems, and the object of the present invention is to provide a non-aqueous electrolyte secondary battery which maintains high battery capacity even when it is used or stored in an environment of high temperatures, such as inside of cars in summer.

For the solution of the above problems, in the non-aqueous electrolyte battery of the present invention, a lithium manganese composite oxide is used for the positive electrode, a material capable of absorbing and releasing lithium is used for the negative electrode, and, furthermore, at least one of sodium, potassium, calcium and strontium is contained in the negative electrode. Thus, manganese ion which dissolves out of the positive electrode can be inhibited from forming a manganese compound of high insulation on the negative electrode, and storage characteristics and cycle characteristics of the battery can be improved.

BEST MODE FOR CARRYING OUT THE INVENTION

Figure 1:
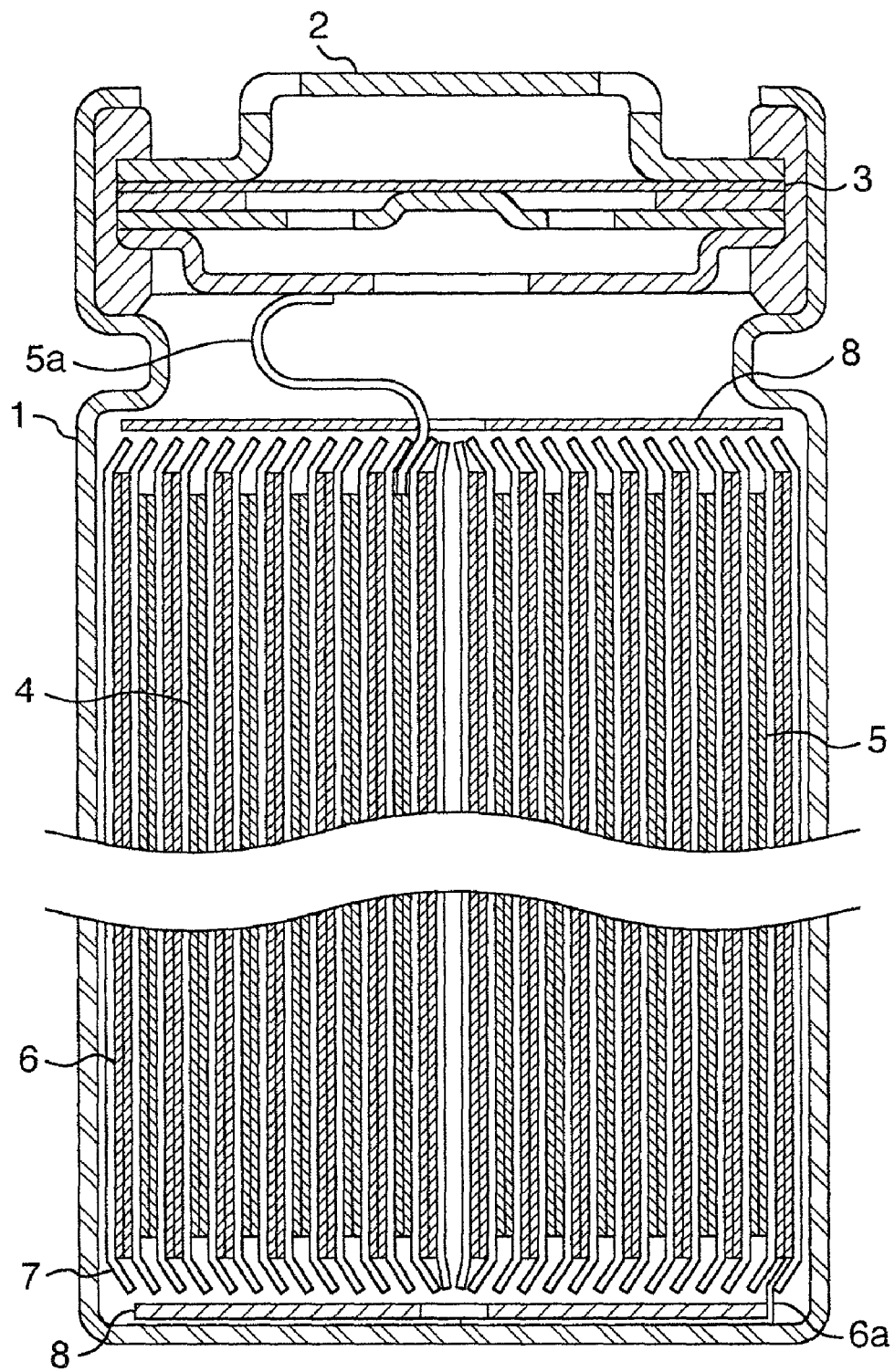
FIG. 1 is a longitudinal sectional view of a cylindrical battery in the examples of the present invention and the comparative examples.

The present invention relates to a non-aqueous electrolyte secondary battery using a lithium manganese composite oxide for a positive electrode material, and a material capable of absorbing and releasing lithium for a negative electrode material, wherein at least one element selected from the group consisting of sodium, potassium, calcium and strontium is contained in the negative electrode.

The mechanism of deterioration of the non-aqueous electrolyte secondary battery of the present invention in an environment of high temperatures will be explained below.

In general, a manganese oxide including an oxidation state of trivalence causes a disproportionation reaction as shown in the formula (1) in the presence of an acid or the like and dissolves.

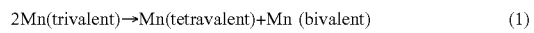

2Mn(trivalent)→Mn(tetravalent)+Mn (bivalent)   (1)

This dissolution phenomenon of manganese occurs also in a non-aqueous electrolyte, and in the case of the non-aqueous electrolyte battery, manganese in the positive electrode material also reacts with the non-aqueous electrolyte and a part of the manganese dissolves, and, furthermore, the disproportionation reaction caused by this dissolution is accelerated in an environment of high temperatures.

The dissolved manganese dissolves in the electrolyte as Mn (bivalent) in the formula (1), and this manganese ion having a plus charge transfers to the side of negative electrode material of minus potential and thereafter produces a manganese compound on the negative electrode material. The manganese compound produced on the negative electrode material hinders transfer of lithium ion which is the inherent charge transferor in the non-aqueous electrolyte battery. Moreover, since the produced manganese compound is close to an insulator, this causes increase of impedance of the battery. It is considered that in this way, non-aqueous electrolyte secondary batteries in an environment of high temperatures brings about loss of capacity of battery after stored.

Therefore, in order to reduce deterioration of battery characteristics of non-aqueous electrolyte secondary batteries after stored in an environment of high temperatures, it is essential not to allow manganese ion to dissolve out of the positive electrode material or not to produce a manganese compound which is high in insulation and deteriorates battery characteristics on the negative electrode even if manganese ion dissolves out.

However, since it is difficult to completely prevent manganese ion from dissolving out of the positive electrode, it is necessary to provide such a state as not to produce the manganese compound of high insulation on the negative electrode.

For this purpose, according to the present invention, either one of the elements of sodium, potassium, calcium and strontium is contained in the negative electrode. It is considered that when these elements are contained, a manganese compound different from the said manganese compound of high insulation, namely, a different manganese compound of low insulation is produced on the negative electrode, and, hence, increase of impedance of the battery is small and loss of capacity is small.

Content of the element of the group of sodium, potassium, calcium and strontium contained in the negative electrode of the present invention is preferably not less than 0.01% by weight and not more than 10% by weight based on the total amount of the negative electrode mix comprising the negative electrode material, binder, additives and the like. If the content is too small, no sufficient effect to improve the battery characteristics can be obtained, and if it is too large, amount of the negative electrode material based on the whole negative electrode decreases and no practical battery characteristics can be obtained. More preferred content is not less than 0.01% by weight and not more than 5% by weight.

In the case of sodium, there may be used compounds such as, for example, NaOH, $Na_2O$, $Na_2O_2$, $NaO_2$, $Na_2CO_3$, $NaHCO_3$, $Na_2SiO_3$, $NaNH_2$, $NaN_3$, $Na_2C_2$ and $NaHC_2$. In the case of potassium, there may be used compounds such as, for example, KOH, $K_2O$, $K_2O_2$, $KO_2$, $KN_3$, $KNH_2$, $K_2C_2$ and $KHC_2$. In the case of calcium, there may be used compounds such as, for example, $Ca(OH)_2$, CaO, $CaO_2$, $CaCO_3$, $Ca_3N_2$, CaNH and $CaC_2$. Furthermore, in the case of strontium, there may be used compounds such as, for example, $Sr(OH)_2$, SrO, $SrO_2$ and $SrCO_3$.

As methods for containing sodium, potassium, calcium and strontium in the negative electrode, there are a method of adding the above compounds to negative electrode material, binder and others to contain them in the negative electrode mix layer, a method of adding the above compounds at the step of producing the negative electrode material, followed by firing the mixture to contain them in the crystals of the negative electrode material, and the like.

The lithium manganese composite oxides used in the present invention include, for example, $LiMn_2O_4$, $LiMnO_2$ (rhombic system, hexagonal system), $Li_2Mn_4O_9$, $Li_4Mn_5O_{12}$, $Li_2MnO_3$, $LiMn_3O_6$, and the like. Especially preferred are $LiMn_2O_4$ (cubic system) and $LiMnO_2$ of rhombic system, because they cause less dissolution of manganese (bivalent) ion which is a cause for the loss of electric capacity.

Moreover, it is preferred that $LiMn_2O_4$ (cubic system) has a specific surface area of not more than 2.0 $m^2/g$, an average particle diameter of not less than 3 μm and not more than 30 μm, and a lattice constant a of not more than 8.25 Å, and it is preferred that $LiMnO_2$ of rhombic system has a specific surface area of not more than 5.0 $m^2/g$, an average particle diameter of not less than 3 μm and not more than 30 μm, and lattice constants a, b, c of not less than 2.75 Å, not less than 5.70 Å, and not less than 4.55 Å, respectively. This is because use of the lithium manganese composite oxides having these properties causes further less dissolution of manganese (bivalent) ion.

The positive electrode and the negative electrode used in the present invention are produced by coating on the surface of a collector a mix layer comprising a positive electrode material or negative electrode material capable of electrochemically and reversibly intercalating and deintercalating lithium ion and additionally a conducting agent, a binder, and the like.

For the positive electrode material used in the present invention, the above-mentioned lithium manganese composite oxides can be used.

Conducting agents for positive electrode used in the present invention can be any electron conducting materials as far as they do not undergo chemical changes at the charge and discharge potentials of the positive electrode material used. For example, there may be used graphite such as natural graphite (flake graphite, etc.) and artificial graphite, carbon blacks such as acetylene black, ketjen black, channel black, furnace black, lamp black and thermal black, conductive fibers such as carbon fibers and metal fibers, metal powders such as carbon fluoride and aluminum, conductive whiskers such as zinc oxide and potassium titanate, conductive metal oxides such as titanium oxide, and organic conductive materials such as polyphenylene derivatives. These can be used each alone or in admixture. Of these conducting agents, artificial graphite and acetylene black are especially preferred. Amount of the conducting agents is not especially limited, but is preferably 1–50% by weight, more preferably 1–30% by weight based on the weight of the positive electrode material. In the case of carbon or graphite, 2–15% by weight is especially preferred.

The binders for positive electrodes used in the present invention may be any of thermoplastic resins or thermosetting resins. Preferred in the present invention are, for example, polyethylene, polypropylene, polytetrafluoroethylene (PTFE), polyvinylidene fluoride (PVDF), styrene-butadiene rubber, tetrafluoroethylene-hexafluoroethylene copolymer, tetrafluoroethylene-hexafluoropropylene copolymer (FEP), tetrafluoroethylene-perfluoroalkylvinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinyl ether-tetrafluoroethylene copolymer, ethylene-acrylic acid copolymer or ($Na^+$) ion crosslinked product thereof, ethylene-methacrylic acid copolymer or ($Na^+$) ion crosslinked product thereof, ethylene-methyl acrylate copolymer or (Na$^+$) ion crosslinked product thereof, ethylene-methyl methacrylate copolymer or (Na$^+$) ion crosslinked product thereof, and the like. These may be used each alone or in admixture. Of these materials, more preferred are polyvinylidene fluoride (PVDF) and polytetrafluoroethylene (PTFE).

As collectors for the positive electrode used in the present invention, there may be used any electron conductors as far as they do not undergo chemical changes at the charge and discharge potentials of the positive electrode material used. For examples, as materials of the collectors, there may be used stainless steel, aluminum, titanium, carbon, conductive resins and, besides, aluminum or stainless steel the surface of which is treated with carbon or titanium. Aluminum or aluminum alloys are especially preferred. The surface of these materials may be oxidized. Moreover, the surface of the collectors may be made rough by a surface treatment. As for the shape of the collectors, they may be in the form of foil, film, sheet, net, punched material, lath, and molded articles of porous body, foamed body, a group of fibers, nonwoven fabrics, and the like. Thickness thereof is not particularly limited, and those of 1–500 µm are used.

The negative electrode materials used in the present invention may be lithium metal, lithium alloys, and compounds capable of absorbing and releasing lithium ions, such as alloys, intermetallic compounds, carbons, organic compounds, inorganic compounds, metal complexes and organic high molecular compounds. These may be used each alone or in combination.

As the lithium alloys, mention may be made of Li-M (M=Al, Ga, Cd, In, Pb, Bi, Mg), Li—Al-M (M=Mn, Mg, Sn, In, Cd, Te), and the like.

The alloys and the intermetallic compounds include compounds of transition metals and silicon, zinc, aluminum or tin, and other compounds.

Examples of the carbonaceous materials are cokes, pyrolytic carbons, natural graphite, artificial graphite, mesocarbon microbeads, graphitized mesophase spherules, vapor deposited carbon, glassy carbons, carbon fibers (polyacrylonitrile fibers, pitch fibers, cellulose fibers and vapor deposited carbon fibers), amorphous carbons, and carbons prepared by firing organic materials. These may be used each alone or in combination. Among them, preferred are graphite materials such as those obtained by graphitizing mesophase spherules, natural graphite and artificial graphite.

The inorganic compounds include, for example, tin compounds and silicon compounds, and inorganic oxides include, for example, titanium oxides, tungsten oxides, molybdenum oxides, niobium oxides, vanadium oxides and iron oxides. Furthermore, inorganic chalcogenides include, for example, iron sulfide, molybdenum sulfide and titanium sulfide. As the organic high molecular compounds, there may be used polythiophene, polyacetylene, and the like, and as nitrides, there may be used cobalt nitrides, copper nitrides, nickel nitrides, iron nitrides, manganese nitrides, and the like.

Conducting agents for negative electrode used in the present invention can be any electron conductive materials. For example, there may be used graphite such as natural graphite (flake graphite, etc.), artificial graphite and expanded graphite, carbon blacks such as acetylene black, ketjen black, channel black, furnace black, lamp black and thermal black, conductive fibers such as carbon fibers and metal fibers, metal powders such as copper and nickel, and organic conductive materials such as polyphenylene derivatives. These can be used each alone or in admixture. Of these conducting agents, artificial graphite, acetylene black and carbon fibers are especially preferred. Amount of the conducting agent is not especially limited, but is preferably 1–50% by weight, more preferably 1–30% by weight based on the weight of the positive electrode material. Since the negative electrode material of the present invention per se has electron conductivity, function as a battery can be performed without adding the conducting agent.

The binders for negative electrodes used in the present invention may be any of thermoplastic resins or thermosetting resins. Preferred in the present invention are, for example, polyethylene, polypropylene, polytetrafluoroethylene (PTFE), polyvinylidene fluoride (PVDF), styrene-butadiene rubber, tetrafluoroethylene-hexafluoroethylene copolymer, tetrafluoroethylene-hexafluoropropylene copolymer (FEP), tetrafluoroethylene-perfluoroalkylvinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinyl ether-tetrafluoroethylene copolymer, ethylene-acrylic acid copolymer or (Na$^+$) ion crosslinked product thereof, ethylene-methacrylic acid copolymer or (Na$^+$) ion crosslinked product thereof, ethylene-methyl acrylate copolymer or (Na$^+$) ion crosslinked product thereof, ethylene-methyl methacrylate copolymer or (Na$^+$) ion crosslinked product thereof, and the like. These may be used each alone or in admixture. Of these materials, more preferred are styrene-butadiene rubber, polyvinylidene fluoride, ethylene-acrylic acid copolymer or (Na$^+$) ion crosslinked product thereof, ethylene-methacrylic acid copolymer or (Na$^+$) ion crosslinked product thereof, ethylene-methyl acrylate copolymer or (Na$^+$) ion crosslinked product thereof, ethylene-methyl methacrylate copolymer or (Na$^+$) ion crosslinked product thereof.

As collectors for negative electrodes used in the present invention, there may be used any electron conductors as far as they do not undergo chemical changes in the constructed batteries. For examples, as materials of the collectors, there may be used stainless steel, nickel, copper, titanium, carbon and conductive resins, and, besides, copper or stainless steel the surface of which is treated with carbon, nickel or titanium. Copper or copper alloys are especially preferred. The surface of these materials may be oxidized. Moreover, the surface of the collectors may be made rough by a surface treatment. As for the shape of the collectors, they may be in the form of foil, film, sheet, net, punched material, lath and molded articles of porous body, foamed body, fiber group, nonwoven fabrics, and the like. Thickness is not particularly limited, and those of 1–500 µm are used.

The electrode mix of positive electrode or negative electrode can contain various additives such as fillers, dispersing agents, ion conductors, pressure-increasing agents and others in addition to the conducting agents and the binders. The fillers can be any fibrous materials which do not undergo chemical changes in the constructed batteries. Generally, olefinic polymers such as polypropylene and polyethylene and fibers such as glass fibers and carbon fibers are used. Amount of the fillers is not especially limited, but is preferably 0–30% by weight based on the weight of the electrode mix.

As to the construction of the negative electrode plate and the positive electrode plate, it is preferred that at least the surface of the negative electrode mix is present facing the surface of the positive electrode mix.

The non-aqueous electrolyte used in the present invention comprises a solvent and a lithium salt which dissolves in the solvent. As the non-aqueous solvent, mention may be made of, for example, cyclic carbonates such as ethylene carbonate (EC), propylene carbonate (PC), butylene carbonate (BC) and vinylene carbonate (VC), chain carbonates such as dimethyl carbonate (DMC), diethyl carbonate (DEC), ethylmethyl carbonate (EMC), and dipropyl carbonate (DPC), aliphatic carboxylic acid esters such as methyl formate, methyl acetate, methyl propionate and ethyl propionate, γ-lactones such as γ-butyrolactone, chain ethers such as 1,2-dimethoxyethane (DME), 1,2-diethoxyethane (DEE) and ethoxymethoxyethane (EME), cyclic ethers such as tetrahydrofuran and 2-methyltetrahydrofuran, and non-protonic organic solvents such as dimethyl sulfoxide, 1,3-dioxolan, formamide, acetamide, dimethylformamide, dioxolan, acetonitrile, propylnitrile, nitromethane, ethyl monoglyme, phosphoric acid triester, trimethoxymethane, dioxolan derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, dimethyl sulfoxide, and N-methylpyrrolidone. They may be used each alone or in admixture of two or more. Among them, preferred are a mixed system of the cyclic carbonate and the chain carbonate or a mixed system of the cyclic carbonate, the chain carbonate and the aliphatic carboxylic acid ester.

The lithium salts which dissolve in these solvents include, for example, $LiClO_4$, $LiBF_4$, $LiPF_6$, $LiAlCl_4$, $LiSbF_6$, $LiSCN$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium salts of lower aliphatic carboxylic acids, LiCl, LiBr, LiI, chloroborane lithium, lithium tetraphenylborate, imides, and the like. These may be contained each alone or in combination of two or more in the electrolyte used and the like. Among them, it is more preferred to use $LiPF_6$.

Especially preferable electrolyte in the present invention is one which contains at least ethylene carbonate and ethylmethyl carbonate and $LiPF_6$ as a supporting electrolyte. Amount of the electrolyte contained in the battery is not particularly limited, and it can be used in a necessary amount depending on the amount of positive electrode material and that of negative electrode material and the size of the battery. Amount of the supporting electrolyte dissolved in the non-aqueous solvent is not particularly limited, but is preferably 0.2–2 mols/l, especially preferably 0.5–1.5 mol/l.

Moreover, in addition to the electrolyte, there may be used the following solid electrolytes. The solid electrolytes are classified into inorganic solid electrolytes and organic solid electrolytes. As the inorganic solid electrolytes, nitrides, halides and oxyacid salts of Li are well known. Among them, effective are $Li_4SiO_4$, $Li_4SiO_4$—LiI—LiOH, $xLi_3PO_4$-$(1-x)Li_4SiO_4$, $Li_2SiS_3$, $Li_3PO_4$—$Li_2S$—$SiS_2$, phosphorus sulfide compounds, and the like. As the organic solid electrolytes, effective are polymer materials such as polyethylene oxide, polypropylene oxide, polyphosphazene, polyaziridine, polyethylene sulfide, polyvinyl alcohol, polyvinylidene fluoride and polyhexafluoropropylene, and derivatives, mixtures and composites thereof.

Moreover, formation of a manganese oxide which is an insulating material on the negative electrode can be further inhibited by adding an element such as aluminum, boron or calcium to the electrolyte. This is because the ion species of the added element is solvated preferentially to manganese ion and, hence, the manganese ion cannot move through the electrolyte. For example, there may be used compounds such as $LiAl(OCH_3)_4$, $AlF_3$, $LiAlH_4$, $LiBF_4$, $LiBH_4$, $LiB_4O_7$, $Ca(BF_4)_2$, $CaB_4O_7$, $Ca(ClO_4)_2$, $CaCO_3$, and $CaF_2$. Amount of the compounds is preferably not less than 0.01 mol % and not more than 5 mol %.

Furthermore, for the purpose of improving discharge capacity, and charge and discharge characteristics, other compounds may be added to the electrolyte. Examples of these compounds are triethyl phosphate, triethanolamine, cyclic ethers, ethylenediamine, n-glyme, pyridine, hexaphosphoric acid triamide, nitrobenzene derivatives, crown ethers, quaternary ammonium salts, ethylene glycol dialkyl ether, and the like.

As the separators used in the present invention, insulating microporous thin films having a high ion permeability and a desired mechanical strength are used. The separators preferably have a function of closing the pores at higher than a certain temperature to enhance the resistance. Sheets, non-woven fabrics or woven fabrics made from olefin polymers comprising one or combination of polypropylene, polyethylene and the like or glass fibers are used from the points of organic solvent resistance and hydrophobic properties. Pore diameter of the separators is preferably such that the positive and negative materials, binders and conducting agents which are released from the electrode sheets do not permeate through the pores, and the pore diameter is preferably 0.01–1 μm. Thickness of the separators is generally 10–300 μm. The porosity is determined depending on permeability to electron or ion, kind of materials or film thickness, and is generally 30–80%.

Furthermore, such batteries can be made in which a polymer material in which an organic electrolyte comprising a solvent and a lithium salt dissolving in the solvent is absorbed and retained is contained in positive electrode mix and negative electrode mix, and a porous separator comprising a polymer which absorbs and retains an organic solvent therein is made integral with the positive electrode and the negative electrode. The polymer material can be any polymers capable of absorbing and retaining the organic electrolyte therein, and a copolymer of vinylidene fluoride and hexafluoropropylene is especially preferred.

The shape of batteries may be any of coin type, button type, sheet type, laminate type, cylindrical type, flat type, square type, and large-sized type for electric cars.

The non-aqueous electrolyte secondary batteries of the present invention can be used for portable information terminals, portable electronic apparatuses, domestic small-sized power storing apparatuses, motorcycles, electric cars, hybrid electric cars, and the like, and the present invention is not limited to these uses.

EXAMPLES

The present invention will be explained in more detail in the following examples, which should not be construed as limiting the invention.

Example 1

FIG. 1 is a longitudinal sectional view of a cylindrical battery used in this example. In FIG. 1, the reference numeral 1 indicates a battery case made by working a stainless steel plate having resistance to organic electrolyte, 2 indicates a sealing plate provided with a safety valve, 3 indicates an insulation packing, 4 indicates an electrode plate group, and a positive electrode and a negative electrode between which a separator 7 is interposed are rolled a plurality of times into a spiral form and inserted in the case 1. A positive electrode lead 5a is drawn from the positive electrode plate 5 and connected to the sealing plate 2, and a negative electrode lead 6a is drawn from the negative electrode plate 6 and connected to the bottom of the battery case 1. The reference numeral 8 indicates an insulation ring, which is provided at the upper and lower portions of the electrode plate group 4.

The negative electrode plate 6 was made in the following manner. Sodium hydroxide (NaOH) as an additive was mixed with 94% by weight of artificial graphite manufactured by Lonza Co., Ltd. as a negative electrode material and 6% by weight of polyvinylidene fluoride resin as a binder so as to give an Na content of 5% by weight based on the whole negative electrode mix. The resulting mixture was dispersed in a dehydrated N-methylpyrrolidinone to prepare a slurry. This slurry was coated on a negative electrode collector comprising a copper foil, followed by drying and rolling to obtain a negative electrode plate. In this case, Na content in the dried negative electrode mix was 5% by weight.

On the other hand, the positive electrode plate 5 was made in the following manner. Five percent by weight of a carbon powder as a conducting agent and 5% by weight of polyvinylidene fluoride resin as a binder were mixed with 90% by weight of a lithium manganate powder belonging to a cubic system (space group Fd3m) and having a specific surface area of 0.95 $m^2/g$, an average particle diameter of 11.5 μm and a lattice constant a=8.20 Å. The resulting mixture was dispersed in a dehydrated N-methylpyrrolidinone to prepare a slurry. This slurry was coated on a positive electrode collector comprising an aluminum foil, followed by drying and rolling to obtain a positive electrode plate.

The non-aqueous electrolyte was prepared by dissolving $LiPF_6$ in a mixed solvent comprising ethylene carbonate and ethylmethyl carbonate at a volume ratio of 1:1 so as to give a concentration of 1.5 mol/l.

The positive electrode plate 5 and the negative electrode plate 6 with the separator 7 interposed therebetween were rolled into a spiral form and inserted in the battery case 1 of 18 mm in diameter and 65 mm in height. The electrolyte was poured into the electrode plate 4, and then the battery was tightly sealed to make a cylindrical battery.

Example 2

A cylindrical battery was made in the same manner as in Example 1, except that the Na content in the dried negative electrode mix was 10% by weight.

Example 3

A cylindrical battery was made in the same manner as in Example 1, except that the Na content in the dried negative electrode mix was 0.01% by weight.

Example 4

A cylindrical battery was made in the same manner as in Example 1, except that sodium carbonate ($Na_2CO_3$) was used as the additive in the negative electrode.

Example 5

A cylindrical battery was made in the same manner as in Example 1, except that sodium amide ($NaNH_2$) was used as the additive in the negative electrode.

Example 6

A cylindrical battery was made in the same manner as in Example 1, except that sodium oxide ($Na_2O_2$) was used as the additive in the negative electrode.

Example 7

A cylindrical battery was made in the same manner as in Example 1, except that potassium hydroxide (KOH) was used as the additive in the negative electrode, and the K content in the dried negative electrode mix was 5% by weight.

Example 8

A cylindrical battery was made in the same manner as in Example 7, except that the K content in the dried negative electrode mix was 10% by weight.

Example 9

A cylindrical battery was made in the same manner as in Example 7, except that the K content in the dried negative electrode mix was 0.01% by weight.

Example 10

A cylindrical battery was made in the same manner as in Example 1, except that calcium hydroxide ($Ca(OH)_2$) was used as the additive in the negative electrode, and the Ca content in the dried negative electrode mix was 5% by weight.

Example 11

A cylindrical battery was made in the same manner as in Example 10, except that the Ca content in the dried negative electrode mix was 10% by weight.

Example 12

A cylindrical battery was made in the same manner as in Example 10, except that the Ca content in the dried negative electrode mix was 0.01% by weight.

Example 13

A cylindrical battery was made in the same manner as in Example 1, except that strontium hydroxide ($Sr(OH)_2$) was used as the additive in the negative electrode, and the Sr content in the dried negative electrode mix was 5% by weight.

Example 14

A cylindrical battery was made in the same manner as in Example 13, except that the Sr content in the dried negative electrode mix was 10% by weight.

Example 15

A cylindrical battery was made in the same manner as in Example 13, except that the Sr content in the dried negative electrode mix was 0.01% by weight.

Example 16

A cylindrical battery was made in the same manner as in Example 1, except that a lithium manganate powder having a specific surface area of 2.02 m²/g, an average particle diameter of 10.7 μm and a lattice constant a=8.20 Å and belonging to a cubic system (space group Fd3m) was used for the positive electrode plate 5.

Example 17

A cylindrical battery was made in the same manner as in Example 1, except that a lithium manganate powder having a specific surface area of 2.93 m²/g, an average particle diameter of 10.9 μm and a lattice constant a=8.20 Å and belonging to a cubic system (space group Fd3m) was used for the positive electrode plate 5.

Example 18

A cylindrical battery was made in the same manner as in Example 1, except that a lithium manganate powder having a specific surface area of 0.97 m²/g, an average particle diameter of 3.1 μm and a lattice constant a=8.20 Å and belonging to a cubic system (space group Fd3m) was used for the positive electrode plate 5.

Example 19

A cylindrical battery was made in the same manner as in Example 1, except that a lithium manganate powder having a specific surface area of 1.05 m²/g, an average particle diameter of 1.2 μm and a lattice constant a=8.20 Å and belonging to a cubic system (space group Fd3m) was used for the positive electrode plate 5.

Example 20

A cylindrical battery was made in the same manner as in Example 1, except that a lithium manganate powder having a specific surface area of 1.08 m²/g, an average particle diameter of 30.5 μm and a lattice constant a=8.20 Å and belonging to a cubic system (space group Fd3m) was used for the positive electrode plate 5.

Example 21

A cylindrical battery was made in the same manner as in Example 1, except that a lithium manganate powder having a specific surface area of 0.95 m²/g, an average particle diameter of 9.7 μm and a lattice constant a=8.25 Å and belonging to a cubic system (space group Fd3m) was used for the positive electrode plate 5.

Example 22

A cylindrical battery was made in the same manner as in Example 1, except that a lithium manganate powder having a specific surface area of 1.03 m²/g, an average particle diameter of 10.3 μm and a lattice constant a=8.30 Å and belonging to a cubic system (space group Fd3m) was used for the positive electrode plate 5.

Comparative Example 1

A cylindrical battery was made in the same manner as in Example 1, except that sodium hydroxide (NaOH) as the additive was not mixed.

These batteries were repeatedly subjected to charging and discharging cycles, one cycle of which consisted of charging at a constant current of 100 mA until the voltage reached 4.3 V and discharging at a constant current of 100 mA until the voltage reached 3.0 V. The charging and discharging were carried out in a thermostatic chamber of 60° C. 100 cycles of the charging and discharging were repeatedly carried out, and the ratio of discharge capacity at the 100th cycle to the initial discharge capacity is shown as capacity retention rate in Table 1 and Table 2.

TABLE 1

| | Added compound | Element contained and amount thereof | | Capacity retention rate after 100 cycles at 60° C. |
|---|---|---|---|---|
| Example 1 | NaOH | Na, | 5 wt. % | 87% |
| Example 2 | NaOH | Na, | 10 wt. % | 89% |
| Example 3 | NaOH | Na, | 0.01 wt. % | 76% |
| Example 4 | Na₂CO₃ | Na, | 5 wt. % | 86% |
| Example 5 | NaNH₂ | Na, | 5 wt. % | 85% |
| Example 6 | Na₂O₂ | Na, | 5 wt. % | 86% |
| Example 7 | KOH | K, | 5 wt. % | 87% |
| Example 8 | KOH | K, | 10 wt. % | 89% |
| Example 9 | KOH | K, | 0.01 wt. % | 77% |
| Example 10 | Ca(OH)₂ | Ca, | 5 wt. % | 85% |
| Example 11 | Ca(OH)₂ | Ca, | 10 wt. % | 87% |
| Example 12 | Ca(OH)₂ | Ca, | 0.01 wt. % | 75% |
| Example 13 | Sr(OH)₂ | Sr, | 5 wt. % | 84% |
| Example 14 | Sr(OH)₂ | Sr, | 10 wt. % | 86% |
| Example 15 | Sr(OH)₂ | Sr, | 0.01 wt. % | 75% |
| Comparative Example 1 | No | | | 73% |

TABLE 2

| | Element contained in negative electrode and amount thereof | Specific surface area of positive electrode (m²/g) | Average particle diameter of positive electrode (μm) | Lattice constant of positive electrode (Å) | Capacity retention rate after 100 cycles at 60° C. |
|---|---|---|---|---|---|
| Example 1 | Na, 5 wt. % | 0.95 | 11.5 | 8.20 | 87% |
| Example 16 | Na, 5 wt. % | 2.02 | 10.7 | 8.20 | 85% |
| Example 17 | Na, 5 wt. % | 2.93 | 10.9 | 8.20 | 78% |
| Example 18 | Na, 5 wt. % | 0.97 | 3.1 | 8.20 | 84% |
| Example 19 | Na, 5 wt. % | 1.05 | 1.2 | 8.20 | 77% |

TABLE 2-continued

|  | Element contained in negative electrode and amount thereof | Specific surface area of positive electrode (m²/g) | Average particle diameter of positive electrode (μm) | Lattice constant of positive electrode (Å) | Capacity retention rate after 100 cycles at 60° C. |
|---|---|---|---|---|---|
| Example 20 | Na, 5 wt. % | 1.08 | 30.5 | 8.20 | 89% |
| Example 21 | Na, 5 wt. % | 0.95 | 9.7 | 8.25 | 85% |
| Example 22 | Na, 5 wt. | 1.03 | 10.3 | 8.30 | 76% |
| Comparative Example 1 | No | 0.95 | 11.5 | 8.20 | 73% |

From Table 1, it can be seen that the non-aqueous electrolyte secondary batteries made in Examples 1–12 were inhibited from cycle deterioration in an environment of high temperatures as compared with the battery made in Comparative Example 1. Furthermore, from the results of Example 1 and Example 2; Example 7 and Example 8; Example 10 and Example 11; and Examples 13 and Example 14 in Table 1, it can be supposed that when Na, K, Ca or Sr is contained in an amount exceeding 10% by weight in the dried negative electrode mix, increase of the effect to inhibit deterioration can no longer be expected. Moreover, when the content of Na, K, Ca or Sr is increased, the amount of the active material of negative electrode relatively decreases to cause deterioration of battery capacity. Therefore, it can be seen that the content of Na, K, Ca or Sr is preferably not more than 10% by weight.

Moreover, from the results of Comparative Example 1 and Example 3, Example 9, Example 12 and Example 15, it can be seen that unless Na, K, Ca or Sr is contained in an amount of not less than 0.01% by weight based on the dried negative electrode mix, a sufficient effect to inhibit the deterioration cannot be obtained.

From the above, it can be seen that the content of Na, K, Ca or Sr in the dried negative electrode mix is reasonably 0.01–10% by weight.

Furthermore, from the results of Example 1, Example 4, Example 5 and Example 6, it can be seen that irrespective of the kind of the compounds added to the negative electrode mix, if the content of Na is the same, the same effect to inhibit the deterioration can be obtained.

From the results of Example 1 and Example 16, Example 17, Example 21 and Example 22, when the specific surface area of the manganese lithium composite oxide of the positive electrode is greater than 2 m²/g, the effect to inhibit the deterioration is small even if Na is contained, and when the lattice constant of the positive electrode is greater than 8.25 Å, the effect to inhibit the deterioration is also small.

From the results of Example 1 and Example 18, Example 19 and Example 20, when the average particle diameter of the manganese lithium composite oxide of the positive electrode is less than 3 μm, the effect to inhibit the deterioration is small, and when the average particle diameter increases, the capacity retention rate increases. However, it was difficult to make batteries having a positive electrode of more than 30 μm in average particle diameter.

From the above, it can be seen that the manganese lithium composite oxide of the positive electrode preferably has a specific surface area of not more than 2.0 m²/g, an average particle diameter of 3–30 μm, and a lattice constant a=not more than 8.25 Å, and belongs to a cubic system (space group Fd3m).

When the same experiment was conducted on $LiMnO_2$ of rhombic system, increase of capacity retention rate due to containing Na and the like was recognized when the oxide had a specific surface area of not more than 5.0 m²/g, an average particle diameter of not less than 3 μm and not more than 30 μm, and lattice constants a, b, c of not less than 2.75 Å, not less than 5.70 Å, and not less than 4.55 Å, respectively.

INDUSTRIAL APPLICABILITY

The present invention can improve storage characteristics in a high-temperature environment and high-temperature cycle characteristics of non-aqueous electrolyte secondary batteries, particularly, non-aqueous electrolyte batteries using a lithium manganese composite oxide as an active material of positive electrode.

The invention claimed is:

1. A non-aqueous electrolyte secondary battery comprising:
   a positive electrode;
   a negative electrode containing a negative electrode mix containing a material capable of absorbing and releasing lithium, wherein the material comprises at least one selected from the group consisting of alloys, intermetallic compounds, carbonaceous materials, organic compounds, inorganic compounds, metal complexes and organic high molecular compounds; and
   a non-aqueous electrolyte, wherein:
   the positive electrode contains a lithium manganese composite oxide, which contains lithium when synthesizing the oxide, as an active material and the negative electrode contains at least one compound selected from the group consisting of $NaOH$, $NaNH_2$, $NaN_3$, $NaHC_2$, $KOH$, $KN_3$, $KNH_2$, $KHC_2$, and $Sr(OH)_2$, and the content of said at least one compound in the negative electrode mix is such that the total content of the elements of sodium, potassium and strontium is not less than 0.01% by weight and not more than 10% by weight based on the negative electrode mix.

2. A non-aqueous electrolyte secondary battery according to claim 1, wherein the lithium manganese composite oxide is of cubic system and has a specific surface area of not more than 2.0 m²/g, an average particle diameter of not less than 3 μm and not more than 30 μm and a lattice constant a of not more than 8.25 Å.

3. A non-aqueous electrolyte secondary battery according to claim 1, wherein the lithium manganese composite oxide is of rhombic system and has a specific surface area of not more than 5.0 m²/g, an average particle diameter of not less than 3 μm and not more than 30 μm, and a lattice constant a of not less than 2.75 Å, b of not less than 5.70 Å and c of not less than 4.55 Å.

4. A non-aqueous electrolyte secondary battery according to claim 1, wherein the material capable of absorbing and releasing lithium consists of at least one selected from the group consisting of:
- at least one carbonaceous material selected from the group consisting of graphite, coke, pyroltytic carbon, mesocarbon microbeads, graphitized mesophase spherules, vapor deposited carbon, polyacrylonitrile fibers, pitch fibers, cellulose fibers, vapor deposited carbon fibers, and amorphous carbon; and
- at least one inorganic compound selected from the group consisting of titanium oxide, tungsten oxide, molybdenum oxide, niobium oxide, vanadium oxide, iron oxide, iron sulfide, molybdenum sulfide, titanium sulfide, polythiopene, polyacetylene, cobalt nitride, copper nitride, nickel nitride, iron nitride, and manganese nitride.

5. A non-aqueous electrolyte secondary battery according to claim 1, wherein the material capable of absorbing and releasing lithium contains no lithium metal or lithium-containing alloy.

* * * * *